US009143588B2

(12) United States Patent
Ohsaki

(10) Patent No.: US 9,143,588 B2
(45) Date of Patent: Sep. 22, 2015

(54) PORTABLE TERMINAL DEVICE HAVING AN ENLARGED-DISPLAY FUNCTION, METHOD FOR CONTROLLING ENLARGED DISPLAY, AND COMPUTER-READ-ENABLED RECORDING MEDIUM

(75) Inventor: Yasunari Ohsaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 421 days.

(21) Appl. No.: 13/522,130

(22) PCT Filed: Dec. 27, 2010

(86) PCT No.: PCT/JP2010/073623
§ 371 (c)(1),
(2), (4) Date: Jul. 13, 2012

(87) PCT Pub. No.: WO2011/089831
PCT Pub. Date: Jul. 28, 2011

(65) Prior Publication Data
US 2012/0287036 A1    Nov. 15, 2012

(30) Foreign Application Priority Data

Jan. 19, 2010   (JP) .................................. 2010-008669

(51) Int. Cl.
*G09G 5/00* (2006.01)
*H04M 1/02* (2006.01)
*G06F 3/0489* (2013.01)

(52) U.S. Cl.
CPC ........... *H04M 1/0247* (2013.01); *G06F 3/0489* (2013.01); *G06F 3/04897* (2013.01); *G06F 2203/04803* (2013.01);

(Continued)

(58) Field of Classification Search
None
See application file for complete search history.

(56) References Cited

U.S. PATENT DOCUMENTS 7,317,449 B2    1/2008  Robbins et al.
7,412,261 B2    8/2008  Tutikawa
(Continued)

FOREIGN PATENT DOCUMENTS

CN       101359274       2/2009
EP        1324570        7/2003
(Continued)

OTHER PUBLICATIONS

Chinese Office Action dated Apr. 30, 2014 in corresponding Chinese Patent Application No. 201080061699.2 with English translation of Chinese Office Action.

(Continued)

*Primary Examiner* — Adam R Giesy
(74) *Attorney, Agent, or Firm* — Young & Thompson

(57) ABSTRACT

The disclosed portable terminal device is provided with: a first display unit (20A) having a first display screen (21A); a second display unit (20B) having a second display screen (21B) juxtaposed to the first display screen (21A); an enlargement frame display control unit that controls the first display screen (21A) in a manner so as to display a frame to be enlarged on one of a plurality of areas within the first display screen (21A); an enlarged information display control unit that controls the second display screen (21B) in a manner so as to display in an enlarged manner on the second display screen (21B) information from the first display screen (21A) displayed within the enlargement frame; and a plurality of area selection keys disposed corresponding to the plurality of areas of the first display screen (21A).

20 Claims, 11 Drawing Sheets

(52) U.S. Cl.
CPC ... *G06F 2203/04806* (2013.01); *H04M 1/0214* (2013.01); *H04M 2250/16* (2013.01)

(56) References Cited

U.S. PATENT DOCUMENTS

| | | | |
|---|---|---|---|
| 2003/0177444 A1* | 9/2003 | Sunata | 715/513 |
| 2004/0057577 A1 | 3/2004 | Tutikawa | |
| 2004/0135813 A1 | 7/2004 | Kanai | |
| 2005/0197763 A1 | 9/2005 | Robbins et al. | |
| 2008/0094421 A1 | 4/2008 | Maeda | |
| 2011/0102354 A1* | 5/2011 | Fuyuno et al. | 345/173 |

FOREIGN PATENT DOCUMENTS

| | | |
|---|---|---|
| EP | 1571536 | 9/2005 |
| JP | 04199371 | 7/1992 |
| JP | 2003-280622 | 10/2003 |
| JP | 2004126842 | 4/2004 |
| JP | 2005-261807 | 9/2005 |
| JP | 2007-180914 | 7/2007 |
| JP | 2007-281659 | 10/2007 |
| JP | 2009-015331 | 1/2009 |
| JP | 2009-110015 | 5/2009 |
| JP | 2009-169452 | 7/2009 |
| JP | 2010-009431 | 1/2010 |
| WO | 2006123513 | 11/2006 |
| WO | 2010001672 | 1/2010 |

OTHER PUBLICATIONS

International Search Report PCT/JP2010/073623 dated Feb. 15, 2011, with English translation.
Extended European search report, dated Mar. 6, 2015, in corresponding European Patent Application No. 10843995.1.
Japanese Office Action, dated Jan. 27, 2015, in corresponding Japanese Patent Application No. 2011-550825, with partial English translation.

* cited by examiner

PORTABLE TERMINAL DEVICE HAVING AN ENLARGED-DISPLAY FUNCTION, METHOD FOR CONTROLLING ENLARGED DISPLAY, AND COMPUTER-READ-ENABLED RECORDING MEDIUM

TECHNICAL FIELD

The present invention relates to a portable terminal device that has an enlarged-display function for enlarging displayed information, a method for controlling an enlarged display and a computer-readable recording medium.

BACKGROUND ART

In a conventional portable terminal device, from the aspect of usage of the device, portability was considered to be the most important, and so as a necessity, the display has been designed to be more compact. However, depending on the information to be displayed, a small screen may be very difficult for users having reduced vision or for elderly users to see. Therefore, in order for such users to be able to view the displayed information, the user typically has to use glasses or a magnifying glass. In order to improve this situation, technology for enlarging the displayed information on a portable terminal device has been disclosed, such as described below.

In the case of the portable terminal device disclosed in Patent Literature 1, when a cursor is placed on a menu or image that is being displayed, the location being focused on is enlarged, and when compared with the information before being focused on, the information is displayed in more detail. In the case of the portable terminal device disclosed in Patent Literature 2, a few characteristic coordinates of the displayed information, such as the contrast of the data, are taken, and based on these, the range to be enlarged is automatically extracted, enlarged and displayed in a partitioned display area on the same display screen. In the case of the portable terminal device disclosed in Patent Literature 3, a touch panel is used on the display screen, and the displayed information that is located inside the area to be enlarged that corresponds to the coordinates touched by the user is enlarged and displayed in another area on the same screen. When doing this, operability is improved by setting which hand is the user's dominant hand. Moreover, control is performed in order that overlapping of the area to be enlarged or the enlarged display area, which is caused by movement of the touched area, can be avoided. Furthermore, by assigning an order of display priority for the enlarged screen display area, the enlarged display area is located in an area where there is a smaller amount of information, and where displaying the enlarged display area will not be a problem.

RELATED LITERATURE

Patent Literature

Patent Literature 1: Unexamined Japanese Patent Application Kokai Publication No. 2009-110015
Patent Literature 2: Unexamined Japanese Patent Application Kokai Publication No. 2007-180914
Patent Literature 3: Unexamined Japanese Patent Application Kokai Publication No. 2009-169452
Patent Literature 4: Unexamined Japanese Patent Application Kokai Publication No. 2005-261807

DISCLOSURE OF THE INVENTION

Problems to Be Solved By the Invention

In the portable terminal devices disclosed in the patent literature above, the user can specify an enlargement rate for part of the displayed information, and enlarge and display that part in a separate area of the display screen. However, normally, in the portable terminal device, there is only one display screen that can be viewed at a single time, so that the enlarged display area is maintained in part of that display screen. However, to make matters worse, in the case of a portable terminal device having large constraints for making the screen compact, when that display screen is divided and an enlarged display is performed on the screen, the amount of information that can be displayed on that small screen is reduced due to the enlarged display. Therefore, visibility of the displayed information is impaired. Moreover, for information that could not fit into the enlarged display area, the cursor must be used again to specify the area on the normal screen to be enlarged, and performing that operation becomes cumbersome. Furthermore, because part of the normally displayed screen is used for performing an enlarged display, there is a problem in that even though an area to be enlarged is made visible by using an enlargement frame or the like, it may be difficult to know which part of the original displayed information is being viewed.

Patent Literature 4 discloses a portable terminal device for medical use, and that portable terminal device comprises two display units having display screens of the same size and shape. In Patent Literature 4, of the two display units that are located side by side, one of the display screens displays enlarged image information, and the other display screen displays enlarged text information. When displaying just image information or just text information, the two screens form one screen, and the enlarged image information or enlarged text information is displayed.

It is feasible for the enlarged information disclosed in Patent Literatures 1 to 3 to be displayed on the portable terminal device disclosed in Patent Literature 4. However, it is necessary to consider how both display screens will be used in order that it is easy to know which part of the information the enlarged information corresponds to.

Taking the related technology into consideration, the object of the present invention is to provide a portable terminal device having an enlarged display function, a control method for an enlarged display and a computer readable recording medium that make it possible to achieve excellent visibility of enlarged information, as well as easy operation when performing enlargement, and make it possible to easily know the correspondence of the enlarged information with the overall displayed information.

Means for Solving the Problems

In order to accomplish the object above, the present invention provides a portable terminal device that has an enlarged display function, and comprises: a first display unit having a first display screen; a second display unit having a second display screen that is arranged side by side with the first display screen; an enlargement frame display control unit that controls the first display screen so that an enlargement frame is displayed in one of a plurality of areas on the first display screen; an enlarged information display control unit that controls the second display screen so that information on the first display screen that is displayed inside the enlargement frame is enlarged and displayed on the second display screen; and a plurality of area selection keys that are arranged so as to correspond to a plurality of areas on the first display screen.

Moreover, the present invention provides a control method for an enlarged display for a portable terminal device that comprises: a first display unit having a first display screen; a second display unit having a second display screen that is arranged side by side with the first display screen; and a plurality of area selection keys that are arranged so as to correspond to a plurality of areas on the first display screen; the control method comprising: a step of selecting one area from among a plurality of areas in the first display screen in response to an area selection key being pressed; a step of displaying an enlargement frame around the selected one area; and a step of enlarging the information on the first display screen that is displayed in the enlargement frame, and displaying that enlarged information on the second display screen.

Furthermore, the present invention provides a computer readable recording medium on which is recorded a program that causes a computer that controls the enlarged display of a portable terminal device comprising: a first display unit having a first display screen; a second display unit having a second display screen that is arranged side by side with the first display screen; and a plurality of area selection keys that are arranged so as to correspond to a plurality of areas on the first display screen; to execute: a process of selecting one area from among a plurality of areas in the first display screen in response to an area selection key being pressed; a process of displaying an enlargement frame around the selected one area; and a process of enlarging the information on the first display screen that is displayed in the enlargement frame, and displaying that enlarged information on the second display screen.

Effect of the Invention

With the portable terminal device having an enlarged display function, the method for controlling an enlarged display, and the computer readable recording medium of the present invention, together with making visibility of enlarged information better, selection of the area to be enlarged is easy, and it is possible to easily know the correlation between the entire displayed information and the enlarged information.

MODES FOR CARRYING OUT THE INVENTION

Figure 1:
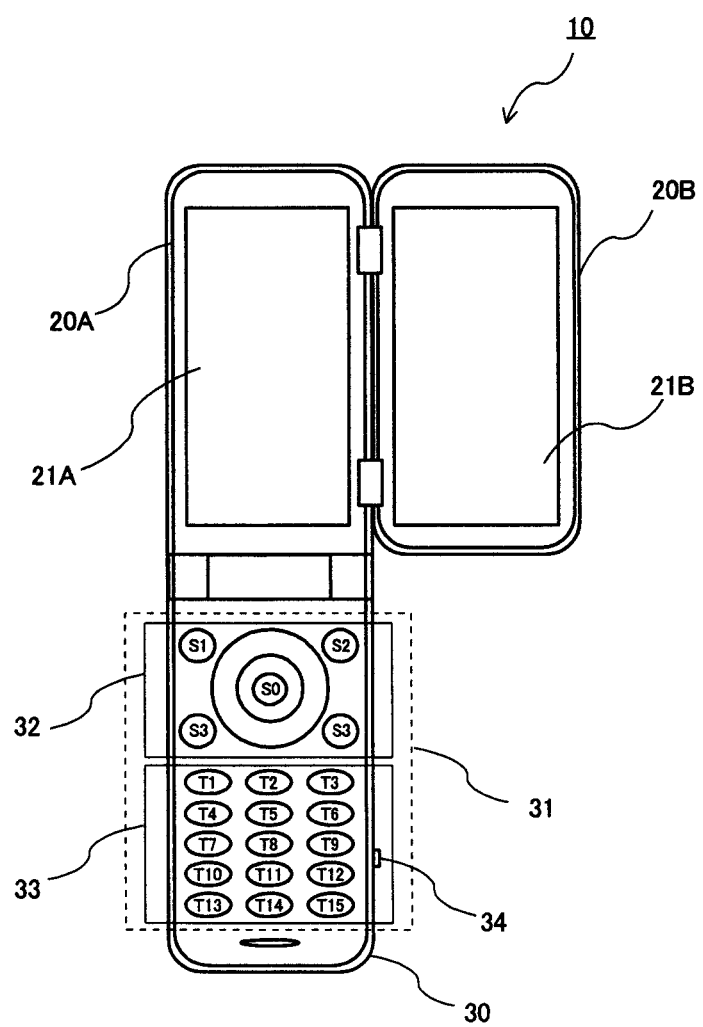
FIG. 1 is a front view illustrating the external appearance of a portable terminal device of a first embodiment of the present invention.

Before explaining embodiments of the present invention, a summary of the present invention will be given. The portable terminal device of the present invention comprises: a first display unit having a first display screen; a second display unit having a second display screen that is arranged side by side with the first display screen; an enlargement frame display control unit that controls the first display screen so that an enlargement frame is displayed in one of a plurality of areas on the first display screen; an enlarged information display control unit that controls the second display screen so that information on the first display screen that is displayed inside the enlargement frame is enlarged and displayed on the second display screen; and a plurality of area selection keys that are arranged so as to correspond to a plurality of areas on the first display screen.

Moreover, the control method for an enlarged display of the portable terminal device of the present invention is a method for controlling the enlarged display on the portable terminal device that comprises a first display unit that has a first display screen, a second display unit that has a second display screen that is arranged side by side with the first display screen, and a plurality of area selection keys that are arranged so as to correspond to a plurality of areas on the first display screen, and has: a step of selecting an area from among a plurality of areas on the first display screen in response to an area selection key being pressed; a step of displaying an enlargement frame in the selected area; and a step of enlarging and displaying information, which is displayed on the first display screen inside the enlargement frame, on the second display screen.

Furthermore, the computer readable recording medium of the present invention stores a program for a computer that controls the enlarged display on the portable terminal device that comprises a first display unit that has a first display screen, a second display unit that has a second display screen that is arranged side by side with the first display screen, and a plurality of area selection keys that are arranged so as to correspond to a plurality of areas on the first display screen, and causes the computer to execute a process of selecting an area from among a plurality of areas on the first display screen in response to an area selection key being pressed; a process of displaying an enlargement frame in the selected area; and a process of enlarging and displaying information, which is displayed on the first display screen inside the enlargement frame, on the second display screen.

With the portable terminal device, the method for controlling an enlarged display, and the computer readable recording medium of the present invention, all of the displayed information that is displayed in the enlargement frame is displayed on the first display screen, and that information on the first display screen that corresponds with a pressed area selection key is enlarged and displayed on the second display screen.

The enlarged information improves visibility, and because both displays are displayed as a pair, it is easy to understand the correlation between the entire displayed information and the enlarged information, and furthermore, the operation for selecting an enlargement area becomes easier.

In the following, the portable terminal device of embodiments of the present invention will be explained in detail with reference to the accompanying drawings. FIG. 1 is a front view illustrating the external appearance of the portable terminal device 10 of a first embodiment of the present invention, and illustrates the state wherein both the first display unit and the second display unit are open. Both display screens can be placed in an overlapping state by rotating the second display unit using a hinge. As illustrated in FIG. 1, by rotating the second display unit using the hinge, it is possible to arrange both display screens so that they are side by side in the left/right direction.

The portable terminal device 10 has a first display unit 20A and a second display unit 20B that respectively have a first display screen 21A and second display screen 21B that are the same size and same shape. By using these two screens, the user is able to perform operation so as to execute a plurality of applications at the same time. Operation of the portable terminal device 10 is executed by pressing the key switches of a key input unit 31 that are assigned to an operation unit 30. That is, the portable terminal device 10 is such that screens are selected and set by pressing the key switches, or sub menus such as function menus are used. The key input unit 31 comprises keys S0 to S4 that are arranged in a so-called soft-key area 32, keys T1 to T15 that are arranged in a numeric key area 33 that is used for inputting numbers and text, and an auxiliary side key 34 that is provided on the side of the terminal body. The soft key S0 is used mainly as a selection key.

Figure 2:
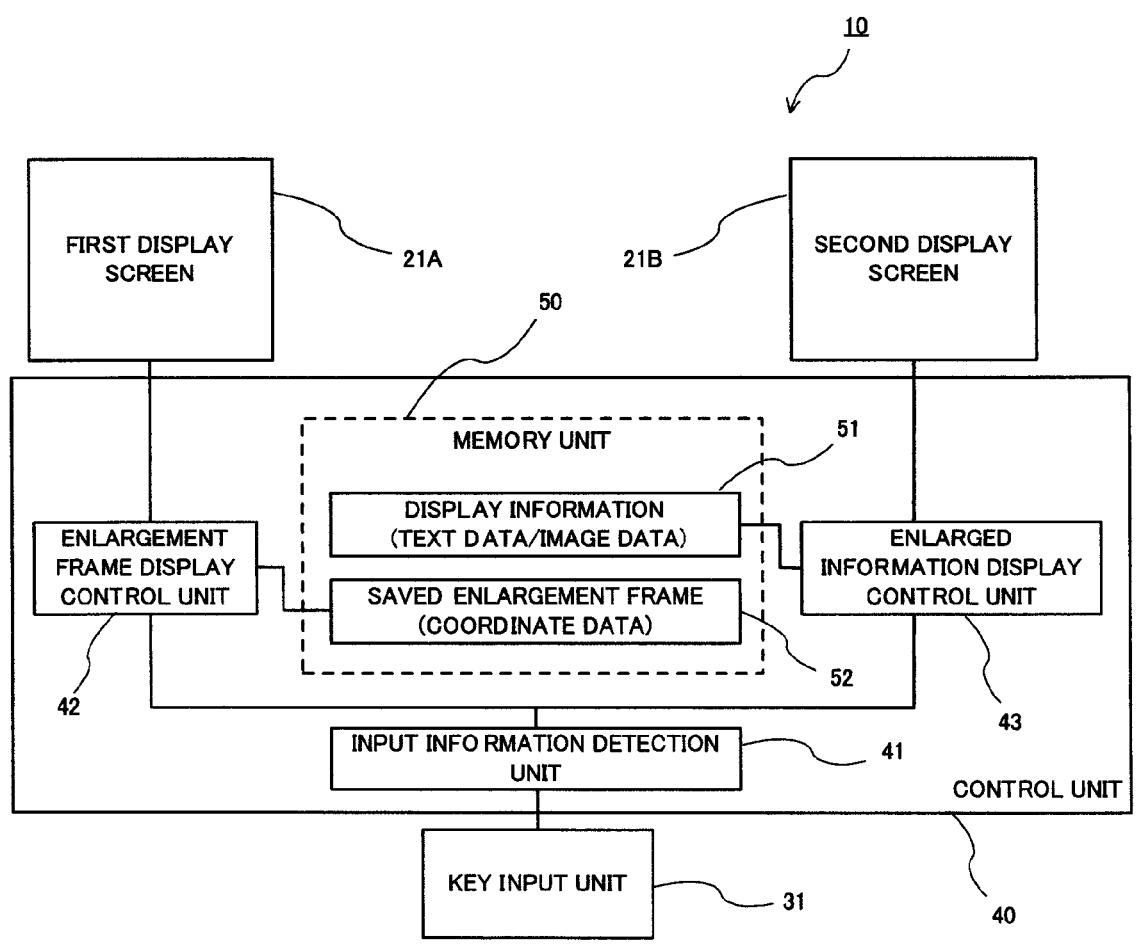
FIG. 2 is a block diagram of the portable terminal device of the first embodiment.

FIG. 2 is a block diagram illustrating the internal construction of the portable terminal device 10. The portable terminal device 10 is broadly divided into a first display screen 21A and a second display screen 21B, a key input unit 31, and a control unit 40. Each display screen 21A, 21B displays the results from the control unit 40 processing the input information from the key input unit 31. The control unit 40 has an input information detection unit 41, an enlargement frame display control unit 42, an enlarged information display control unit 43 and a memory unit 50. The input information detection unit 41 detects the operation instruction that was inputted from the key input unit 31 as coordinates, and transfers those coordinates to the enlargement frame display control unit 42 and enlarged information display control unit 43 as data.

Based on the coordinate data that was inputted from the input information detection unit 41, the enlargement frame display control unit 42 sets the coordinates for the enlargement frame that will be displayed on the first display screen 21A, and actually causes the enlargement frame to be displayed on the first display screen 21A. Similarly, the enlarged information display control unit 43 also receives coordinate data from the input information detection unit 41, and based on that coordinate data, enlarges the enlargement area for the read display information 51 (described later) (information that will be displayed inside the enlargement frame), and causes that enlarged information to be displayed on the second display screen. Information that is necessary when executing the enlargement process for enlarging the display information is stored in the memory unit 50. The display information 51 is display data (for example, text data in txt format, or image data in bmp format) that is displayed on a normal screen and that has not been enlarged. A saved enlargement frame 52 is coordinate data of the enlargement frame that was previously displayed, which is saved so that the enlargement frame can be displayed again after the display of the enlargement frame has been hidden.

Figure 3:
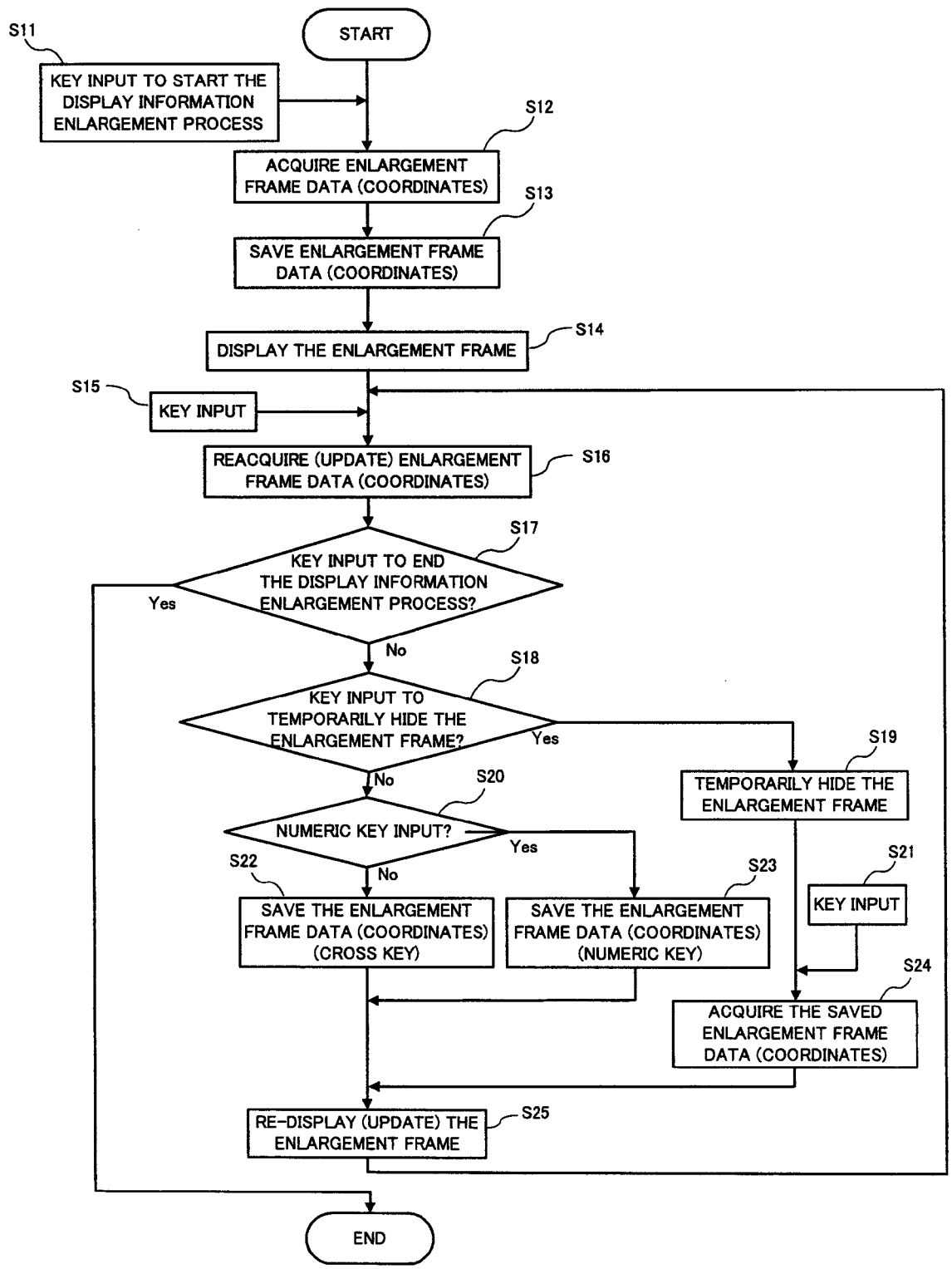
FIG. 3 is a flowchart illustrating the processing by an enlargement frame display control unit of the portable terminal device of the first embodiment.

Next, processing in a first embodiment will be explained in detail with reference to the flowcharts in FIG. 3 and FIG. 4, and the explanative drawings of the enlargement process in FIG. 5 to FIG. 8. FIG. 3 illustrates the processing by the enlargement frame display control unit 42. It is presumed that suitable application software is currently displayed on the first display screen 21A. First, the user starts the display information enlargement process in order to enlarge this display information and display and view the enlarged information on the second display screen 21B. To start this processing, the soft key S0 that is used as a selection button is pressed for a long time (step S11). Here, the input information detection unit 41 detects the coordinate data for the enlargement frame that indicates the area that the user desires to enlarge, and transfers that data to the enlargement frame display control unit 42. Next, after acquiring this coordinate data (step S12), the enlargement frame display control unit 42 saves this coordinate data in the memory unit 50 (step S13). When doing this, a saved enlargement frame 52 is saved in the memory unit 50 as coordinate data. Based on this coordinate data, the enlargement frame display control unit 42 causes an enlargement frame to be displayed on the first display screen 21A (step S14).

Here, the state of the display of the enlargement frame in step S14 and in step S25 (described later) will be described with reference to FIG. 5 to FIG. 8. Typically, in the case of a portable terminal device 10 that is subject to constraints of compactness and for which it is not possible to freely place or add input keys, the frequency that the keys arranged in the numeric key area 33 are used as input keys is high. Therefore, after the display information enlargement process has been started by pressing the S0 key located in the soft-key area 32 for a long time, there is then a one-on-one relationship between display positions of the enlargement frames on the first display screen 21A and the locations of the numeric keys. In other words, as illustrated in FIG. 5 to FIG. 8, the first display screen 21A of the portable terminal device 10 of this embodiment is divided into 15 division; 5 rows×3 columns. In the portable terminal device 10 there are 15 numeric keys T1 to T15 that are arranged in 5 rows×3 columns, so, according to the arrangement of these 15 numeric keys T1 to T15, one numeric key is assigned for each display area division on the first display screen 21A (for explanation purposes, dashed lines are displayed in the figures for convenience; however, these line are actually not displayed). The positions of the numeric keys and the areas are just an example, and can be suitably changed.

Figure 8:
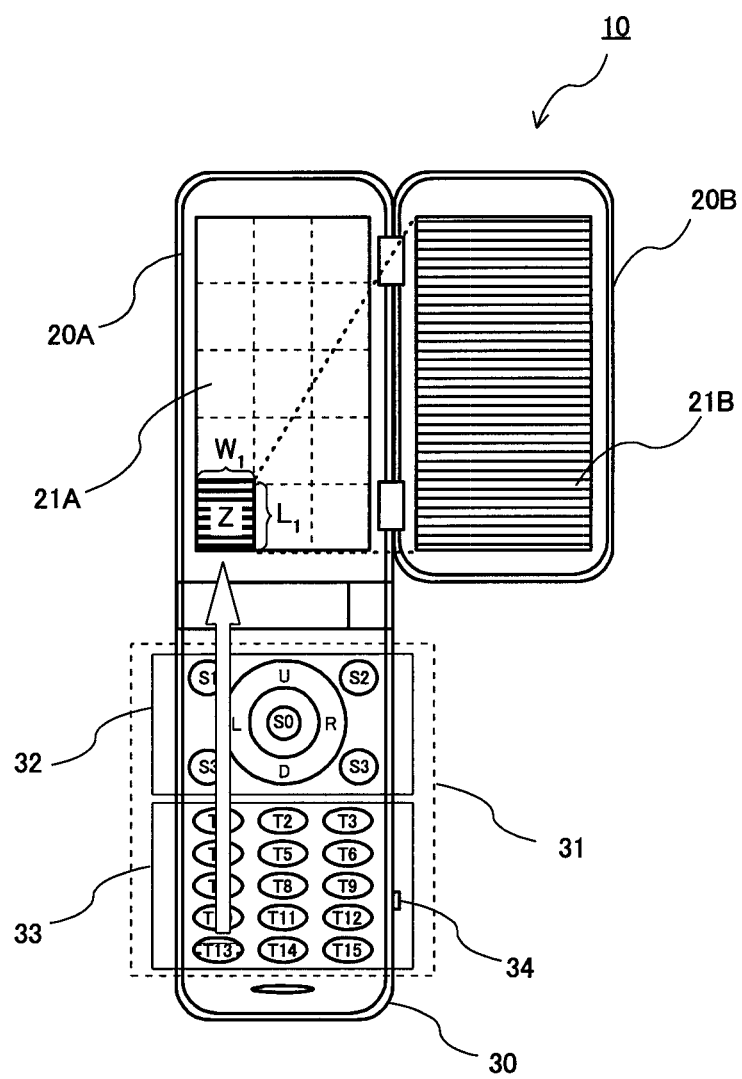
FIG. 8 is a front view illustrating the state of an enlarged display on the portable terminal device of the first embodiment.

For example, as illustrated in FIG. 8, when the key T13 is pressed, area Z on the first display screen 21A that corresponds to this key is recognized as the enlargement area, and the enlargement frame is displayed around this area. When a different numeric key is pressed, the enlargement frame is moved to a different area that corresponds to the pressed numeric key. Alternatively, by pressing the up/down/left/right cross key, the coordinates of the enlargement frame move a preset amount in the indicated direction. Moreover, the display information enlargement process is started by pressing the S0 key for a long time, so at the start, as a default, the enlargement frame is displayed in area X (FIG. 5) that is located in the center of the screen in the same way as when key T8 is pressed (step S14). The side key 34 can be designated as the key for hiding the display of the enlargement frame.

Figure 5:
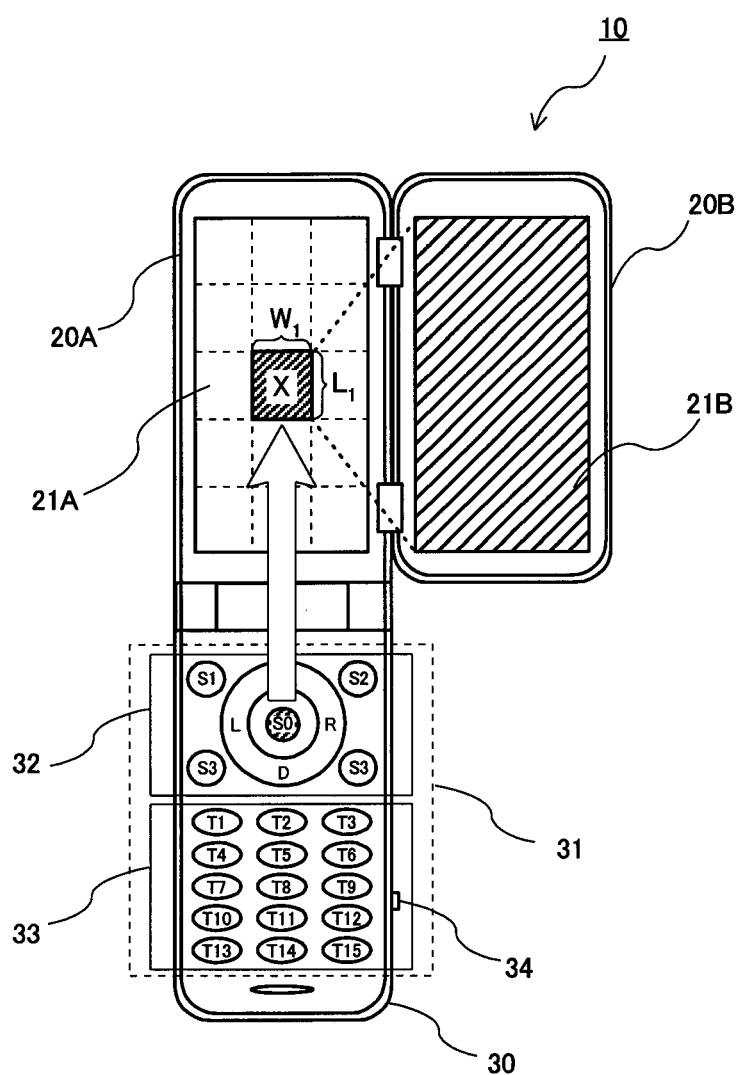
FIG. 5 is a front view illustrating the state of an enlarged display on the portable terminal device of the first embodiment.

Ending the display information enlargement process is performed, for example, by pressing the S0 key for a long time. Furthermore, the soft keys S1 to S4 of the portable terminal device 10 are used when the information that is displayed on the first display screen 21A cannot fit in one screen. In other words, when the information covers a plurality of pages vertically and horizontally, it is possible to assign a function for changing the page up, down, left or right to these keys S1 to S4. With the construction described above, in step S14, the enlargement frame is displayed around area X as illustrated in FIG. 5.

Figure 6:
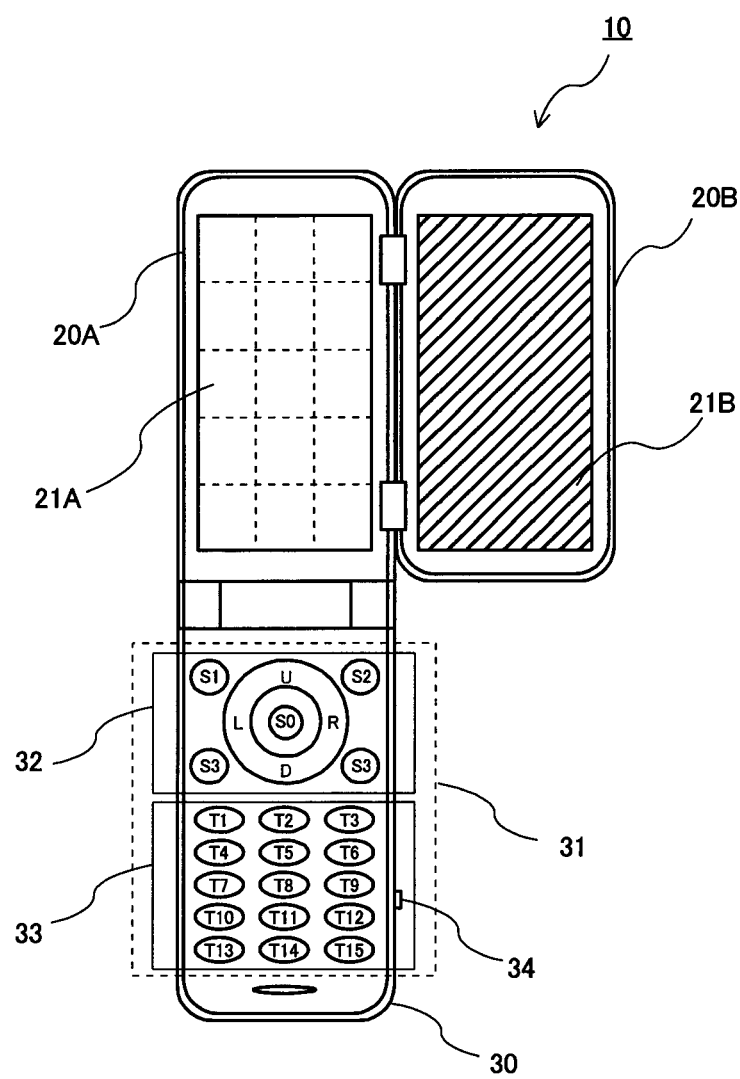
FIG. 6 is a front view illustrating the state of an enlarged display on the portable terminal device of the first embodiment.

Next, in step S15, it is assumed that the user inputs key input. In step S16, as in step S12, when starting the display information enlargement process, the enlargement frame display control unit 42 acquires coordinate data corresponding to the inputted key from the input information detection unit 41. Here, first, the enlargement frame display control unit 42 determines whether or not the input is intended to end the display information enlargement process by pressing the S0 key for a long time (step S17). When the result of this judgment is "YES", the display information enlargement process ends. When the result of the judgment in step S17 is "NO", it is determined whether or not the input was pressing of the side key 34 to temporarily hide the display of the enlargement frame as described above (step S18). When the result of this judgment is "YES", then in step S19, as illustrated in FIG. 6, the enlargement frame display control unit 42 hides the display of the enlargement frame. After that, when there is key input (step S21), regardless of what key was inputted, the enlargement frame display control unit 42 acquires the saved enlargement frame 52, which is coordinate data that is saved in the memory unit 50 (step S24). The enlargement frame is then displayed again in the area where it was displayed before being hidden (step S25).

Figure 7:
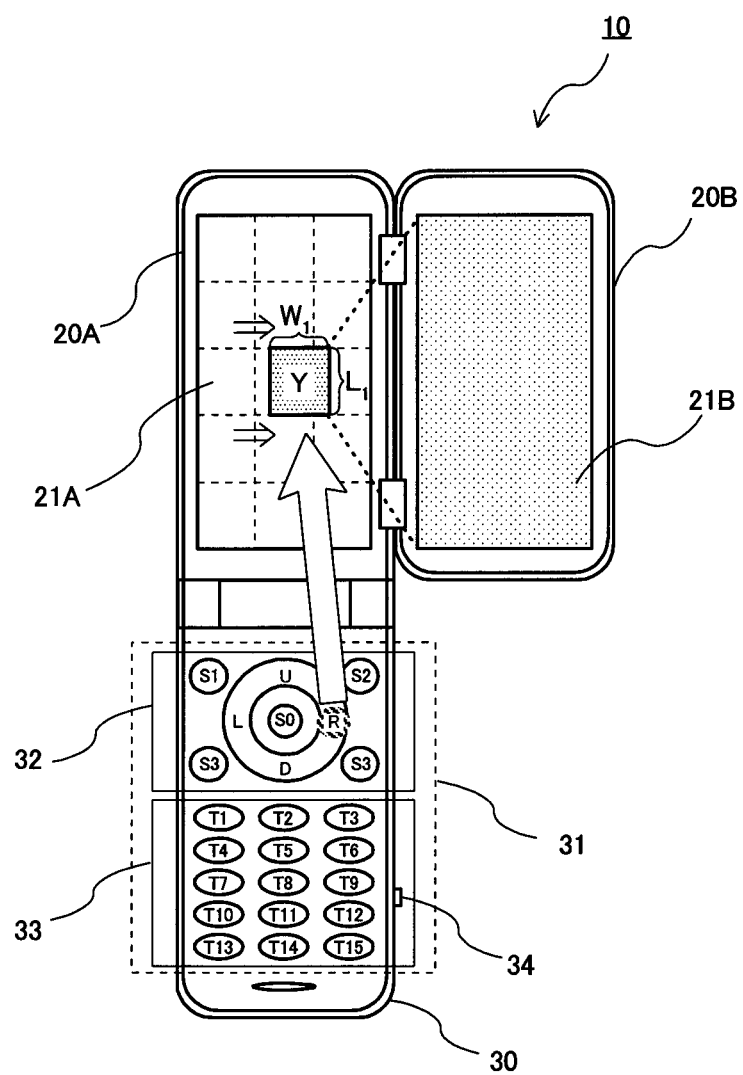
FIG. 7 is a front view illustrating the state of an enlarged display on the portable terminal device of the first embodiment.

On the other hand, in step S15, when the inputted key is not for ending the display information enlargement process (step S17: NO), and when it is also not for hiding the enlargement frame (step S18: NO), it is input of a cross key or a numeric key (in this flowchart, processing by pressing a key S1 to S4 is not considered). In this case, it is determined whether the input key was a cross key or a numeric key (step S20), and as in step S12 and step S13, the enlargement frame display control unit 42 rewrites and saves the newly acquired coordinate data in the memory unit 50 as a saved enlargement frame 52 (cross key: step S22, numeric key: step S23). Next, when the result of the judgment in step S20 is "YES", the enlargement frame is moved to and displayed at a destination indicated by the numeric key, and when the result of the judgment is "NO", the enlargement frame is moved up, down, left or right according to the cross key input and displayed (step S25). For example, when the "right" cross key is pressed, then as illustrated in FIG. 7, the enlargement frame is moved to the right a default amount without the size of the frame being changed, and is displayed around area Y as the movement destination. When the numeric key T13 was pressed, then as illustrated in FIG. 8, the enlargement frame is displayed around area Z.

Figure 4:
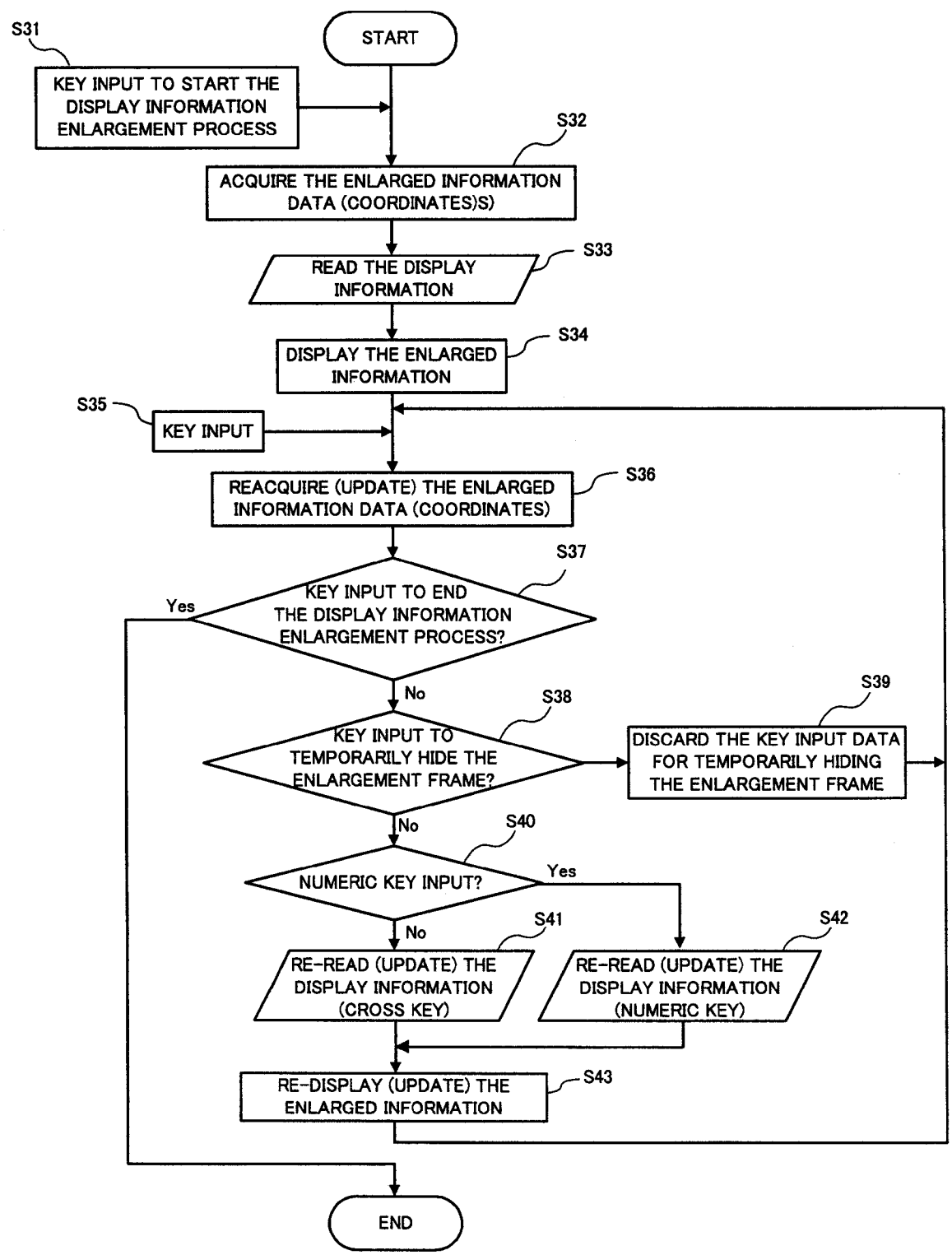
FIG. 4 is a flowchart illustrating the processing by the enlarged information display control unit of the portable terminal device of the first embodiment.

FIG. 4 is a flowchart illustrating the processing by the enlarged information display control unit 43, like the enlargement frame display control unit 42, the enlarged information display control unit 43 receives coordinate data from the input information detection unit 41, and after that, uses that coordinate data to generate the actual enlarged information, and executes a process to display that information on the second display screen 21B. Therefore, a large part of the processing by the enlarged information display control unit 43 is the same as the processing illustrated in the flowchart in FIG. 3. Therefore, here, an explanation of the processing in FIG. 4 that is the same as the processing in FG. 3 will be omitted, and only the processing that is different from that in FIG. 3 will be explained.

The enlarged information display control unit 43 enlarges the information that will actually be displayed, and displays the information. In order for this, after the coordinate data is received from the input information detection unit 41 (step S32), the enlarged information display control unit 43, based on the coordinate data, reads the information of the display information 51 that is saved in the memory unit 50 that is for the enlargement area (step S33). As described above, the display information 51 is display information that comprises text data in txt format, and image data in bmp format. The information of the display information 51 that is in the enlargement area is, in other words, the same as the information that is displayed inside the enlargement frame. Next, the enlarged information display control unit 43 enlarges this enlargement area and displays that enlarged area on the second display screen 21B (step S34). In step S38, it is determined whether or not the side key 34 was pressed in order to temporarily hide the enlargement frame. However, the enlarged information display control unit 43 does not perform control to display or hide the display of the enlargement frame, so when input data is received by the side key 34 being pressed (step S38: YES), the enlarged information display control unit 43 discards that input data (step S39). The steps in FIG. 3 described above that correspond with the steps in FIG. 4 are as follows. That is, the combinations of corresponding steps are S11-S31, S12-S32, S14-S34, S15-S35, S16-S36, S17-S37, S18-S38, S20-S40 and S25-S43.

With the portable terminal device 10 of the embodiment described above, the following effects can be obtained. As a first effect, the enlarged information becomes easier to view compared with portable terminal devices of related technology. The reason for this is, differing from the method of dividing one screen and displaying the enlarged information on one division, the entire information and partial enlarged information are displayed on separate display screens, and are displayed side by side. Particularly, with the portable terminal device of this embodiment, there are two display screens having the same size, and a control method for an enlarged display is employed for the portable terminal, so that it is possible to view the enlarged information as is on a large screen, thus markedly making it easier to view the information. Moreover, an enlargement frame is displayed on the first display screen, so it is possible to know at a glance which portion of the original display information is currently being displayed on the second display screen. Therefore, it is possible to easily determine the correspondence of both.

The second effect is that processing for performing an enlarged display becomes easier. This is because a control method for an enlarged display that uses numeric keys having a unique input method is adopted for the portable terminal device. Particularly, in this embodiment, by using this control method for an enlarged display, it is possible to change the area to be enlarged by simply pressing a numeric key and changing the area to the area that corresponds to the position of that key. In other words, when moving the enlargement frame in order to change the information to be enlarged, it is not necessary to perform an operation such as repeatedly pressing the cross key, and it is possible to instantly cause the enlargement frame to jump to the desired location for the enlarged display.

It is possible to provide icons on both the first display screen and second display screen for performing operations to control the display information. For example, a display screen selection key can be provided for selecting either the first display screen or second display screen. In response to selecting the display screen by pressing the display screen selection key, the control unit activates the icons that are provided for the selected display screen. As a result, it is possible to add special processing for the information that is displayed on the display screen for which the icons are displayed; for example, it is possible to add processing such as inverting, rotating and enlarging the display information.

Figure 9:
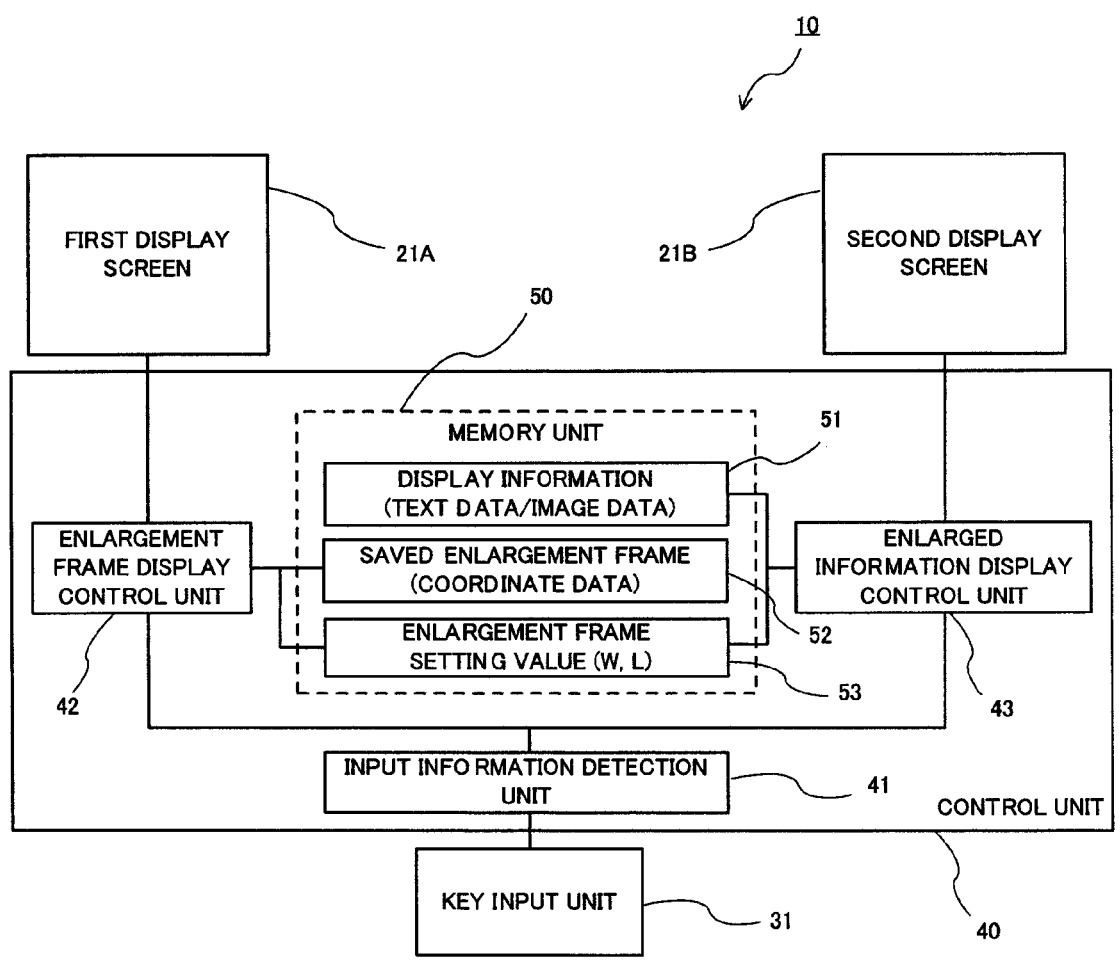
FIG. 9 is a block diagram of a portable terminal device of a second embodiment of the present invention.
Figure 10:
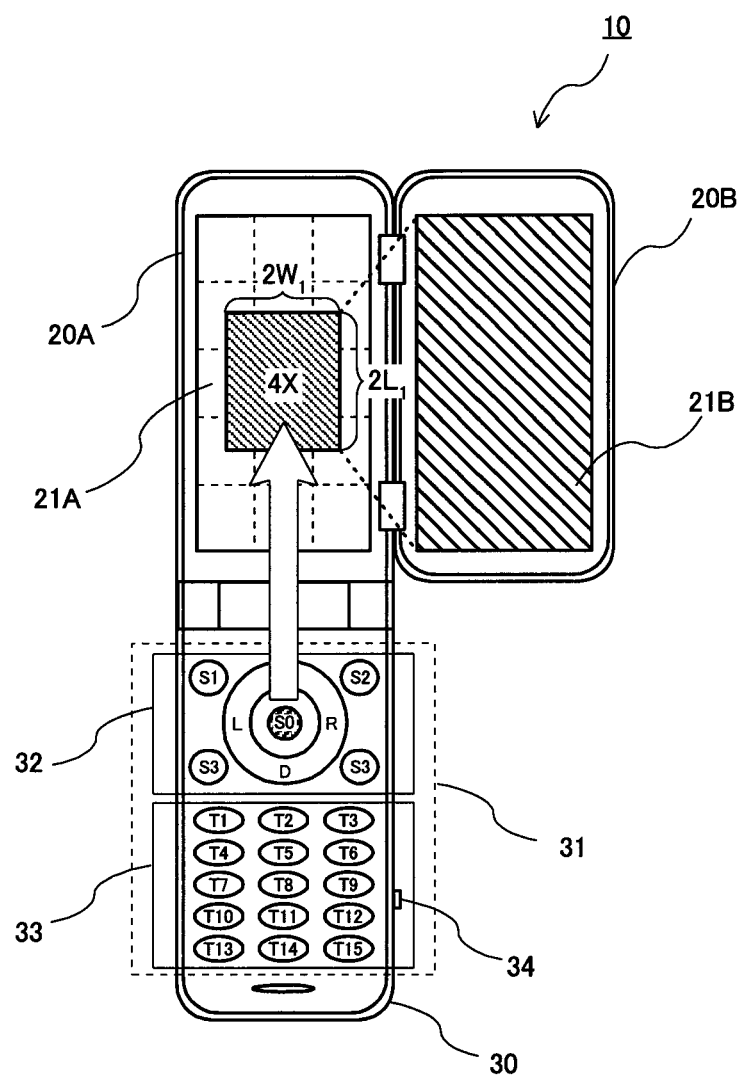
FIG. 10 is a front view illustrating the state of an enlarged display on the portable terminal device of the second embodiment.
Figure 11:
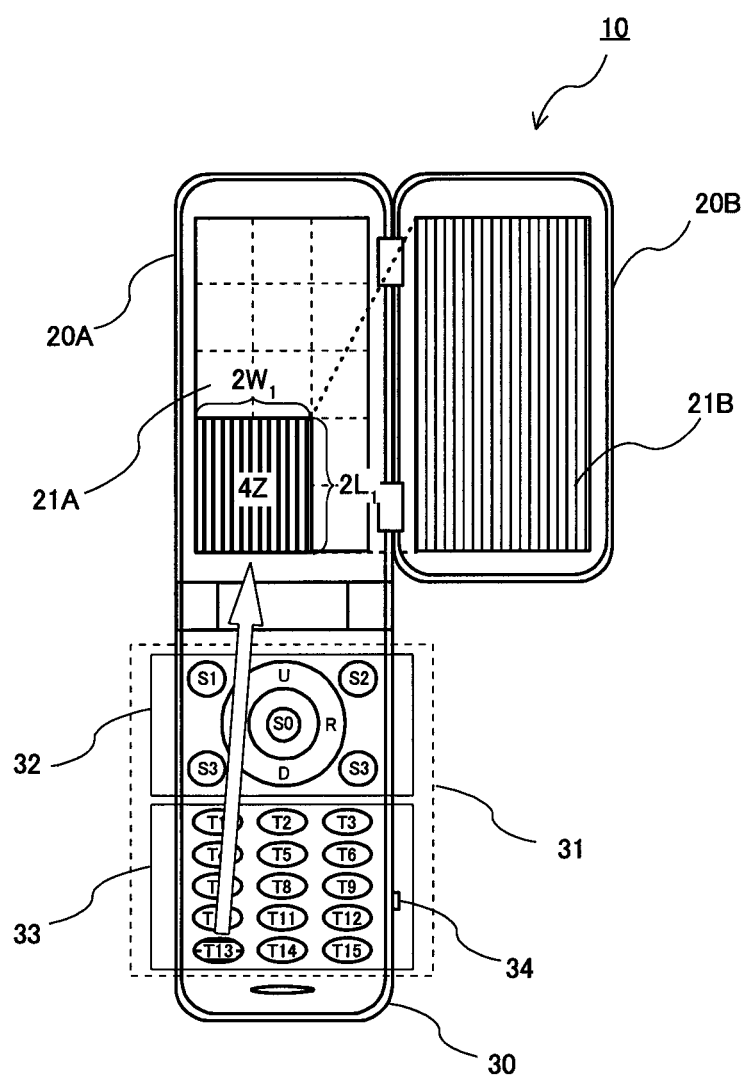
FIG. 11 is a front view illustrating the state of an enlarged display on the portable terminal device of the second embodiment.

Next, a portable terminal device of a second embodiment of the present invention will be explained in detail with reference to FIG. 9 to FIG. 11. FIG. 9 is a block diagram illustrating the internal construction of the portable terminal device 10 of this embodiment, where, in addition to the construction illustrated in FIG. 2, an enlargement frame setting value 53 is stored in the memory unit 50. The external appearance is the same as that in the first embodiment illustrated in FIG. 1. The enlargement frame setting value 53 represents a parameter that changes the size of the enlargement frame, and can be set by the user from a function menu. The settable parameter is the width (horizontal, vertical) of the enlargement frame, or in other words, is a relative coordinates and this is saved as (W, L). By being able to set this parameter (W, L), the enlargement frame display control unit 42, when displaying the enlargement frame, changes the size of the enlargement frame according to the parameter (W, L), and displays that enlargement frame on the first display screen 21A.

Moreover, similarly, the enlarged information display control unit 43 enlarges the size of the information to be enlarged based on the parameter (W, L), and displays the information on the second display screen 21B. In the first embodiment, this value was a fixed value, so that the enlargement frame and enlarged information were always displayed at the same size. FIG. 10 illustrates the state of enlarging the enlargement frame and enlarged information for an example where the parameter value is taken to be $(W_1, L_1)$ in the first embodiment, and the parameter value $(W_2, L_2)$ in the second embodiment is taken to be $(2W_1, 2L_1)$. As in the first embodiment, the display information enlargement process starts by pressing the S0 key for a long time. The size of the enlargement frame is twice the height and width, so overall, the enlargement frame is displayed on the first display screen 21A at four times the area 4X. Then the display information of this area is enlarged and displayed on the second display screen 21B. In this case as well, as a default, the enlargement frame is displayed around the display area at the center of the screen as in the case when the key T8 is pressed. After that, as illustrated in FIG. 11, when the user presses the key T13, the enlargement frame is displayed around an area 4Z on the first display screen 21A, and the enlarged information is displayed on the second display screen 21B.

In this embodiment, the area to be enlarged is set according to the enlargement frame setting value 53 (W, L) to be a multiple of the size of the area corresponding to the pressed key. When doing this, as described above, when the center key T8 is pressed, an area that is 4 times the size of the area corresponding to the key T8 is displayed as the center. Moreover, when the key T13 is pressed, for example, an area that is 4 times the size and that includes the corner area corresponding to key T13 and the surrounding areas is displayed. The enlargement frame display control unit 42, depending on the key that is pressed, sets the area to be enlarged by determining whether the area to be enlarged is to be an area that is centered around the area that corresponds to the pressed key, or is an area that includes the area of the pressed key and the surrounding areas.

Instead of the enlargement frame setting value 53, it is also possible to use an enlargement rate setting value for the enlargement frame information on the second display screen 21B. This is because the size and enlargement rate of the enlargement frame are uniquely linked. For example, when the enlargement frame setting value 53 is changed from $(W_1, L_1)$ to $(2W_1, 2L_1)$, the enlargement rate of the information displayed on the second display screen 21B with respect to the information displayed on the first display screen 21A is necessarily changed to ¼th.

In the second embodiment, the following effects are obtained in addition to those of the first embodiment. That is, the user can enlarge the display information at a desired magnification rate. The reason for that is that by adding an enlargement frame setting value 53 in the memory unit 50, it becomes possible for the user to arbitrarily change the size (W, L) of the enlargement frame. With this construction, when the enlargement frame is too small and the enlarged information in that area is too large and difficult to view, or when the enlargement frame is large and the enlarged information is still too small, the user is able to eliminate such a problem by changing the size to a desirable size.

The present invention was specially presented and explained with reference to exemplary embodiments; however, the invention is not limited to those embodiments or variations of those embodiments. The present invention can be modified or changed in various way that are obvious to one skilled in the art without deviating from the spirit or scope of the invention as defined in the accompanying claims.

By applying the program that is executed by the control unit 40 in order to achieve the functions of the portable terminal device 10 of the embodiments above to an existing portable telephone or the like, it is possible to cause that portable telephone to function as the portable terminal device of the present invention.

The method for distributing this kind of program is arbitrary; for example, the program can be stored on a computer readable recording medium such as a CD-ROM (Compact Disk Read-Only Memory), a DVD (Digital Versatile Disk), an MO (Magneto Optical Disk) a memory card and the like and distributed, or can be distributed over a communication network such as a portable telephone network, the Internet or the like.

This application claims the benefit of Japanese Patent Application 2010-008669, filed on Jan. 19, 2010, the entire disclosure of which is incorporated by reference herein.

EXPLANATION OF THE REFERENCE NUMBERS

10: Portable terminal device
20A: First display unit
20B: Second display unit
21A: First display screen
21B: Second display screen
30: Operation unit
31: Key input unit
32: Soft key area
33: Numeric key area
40: Control unit
41: Input information detection unit
42: Enlargement frame display control unit
43: Enlarged information display control unit
50: Memory unit
51: Display information
52: Saved enlargement frame
53: Enlargement frame setting value

The invention claimed is:

1. A portable terminal device comprising:
a first display unit having a first display screen;
a second display unit having a second display screen that is arranged side-by-side with the first display screen;
a plurality of area selection keys that are physical keys each including a key switch, the area selection keys being arranged to correspond to coordinate data indicating positions of a plurality of areas in the first display screen;
an input information detection unit that detects an operation instruction input to one of the area selection keys that is selected by pressing one of the key switches and outputs the coordinate data;
an enlargement frame display control unit that receives the coordinate data from the input information detection unit, saves the received coordinate data as an enlargement frame, and controls the first display screen so that the enlargement frame is displayed around an enlargement area of the plurality of areas, the enlargement area corresponding to the selected area selection key; and
an enlarged information display control unit that receives the coordinate data from the input information detection unit, reads display information stored in a memory saved for the enlargement area, and controls the second display screen so that the read display information on the first display screen that is displayed inside the enlargement frame is enlarged and displayed on the second display screen.

2. The portable terminal device according to claim 1, wherein the second display screen has virtually the same shape and size as the first display screen.

3. The portable terminal device according to claim 2, wherein the first display screen and the second display screen are configured to be moved between a first arrangement of being arranged side-by-side in the left and right direction, and a second arrangement of the first display screen and second display screen being folded on top of each other.

4. The portable terminal device according to claim 3, wherein the plurality of area selection keys, which are physical keys each including the key switch, include numeric keys, and the locations of the plurality of areas correspond to the locations of the numeric keys.

5. The portable terminal device according to claim 3, wherein the enlargement frame display control unit, in response to a specified operation, causes the enlargement frame to move on the first display screen.

6. The portable terminal device according to claim 3, wherein the enlargement frame display control unit, depending on an enlargement frame setting value, sets the enlargement frame so as to include areas of different sizes.

7. The portable terminal device according to claim 2, wherein the plurality of area selection keys, which are physical keys each including the key switch, include numeric keys, and the locations of the plurality of areas correspond to the locations of the numeric keys.

8. The portable terminal device according to claim 2, wherein the enlargement frame display control unit, in response to a specified operation, causes the enlargement frame to move on the first display screen.

9. The portable terminal device according to claim 2, wherein the enlargement frame display control unit, depending on an enlargement frame setting value, sets the enlargement frame so as to include areas of different sizes.

10. The portable terminal device according to claim 2, wherein the enlargement frame display control unit, depending on an enlargement rate setting value of the second display screen, sets the enlargement frame so as to include areas of different sizes.

11. The portable terminal device according to claim 1, wherein the plurality of area selection keys, which are physical keys each including the key switch, include numeric keys, and the locations of the plurality of areas correspond to the locations of the numeric keys.

12. The portable terminal device according to claim 11, wherein the enlargement frame display control unit, in response to a specified operation, causes the enlargement frame to move on the first display screen.

13. The portable terminal device according to claim 1, wherein the enlargement frame display control unit, in response to a specified operation, causes the enlargement frame to move on the first display screen.

14. The portable terminal device according to claim 1, wherein the enlargement frame display control unit, depending on an enlargement frame setting value, sets the enlargement frame so as to include areas of different sizes.

15. The portable terminal device according to claim 1, wherein the enlargement frame display control unit, depending on an enlargement rate setting value of the second display screen, sets the enlargement frame so as to include areas of different sizes.

16. The portable terminal device according to claim 1, further comprising:
a selection control unit that, in response to a selection by a display screen selection key, selects either the first display screen or the second display screen; and
an icon display control unit that, in response to the selection by the selection control unit, activates icons that are displayed on either the first display screen or the second display screen.

17. The portable terminal device according to claim 1, wherein the enlargement frame display control unit, depending on an enlargement frame setting value stored as a parameter in a memory unit, sets the enlargement frame to a size according to the stored parameter.

18. The portable terminal device according to claim 1, wherein the enlargement frame display control unit, depending on an enlargement frame setting value, sets the enlargement frame to be a pre-stored multiple of the size of the area corresponding to the selected area selection key.

19. A control method for an enlarged display for a portable terminal device that includes a first display unit having a first display screen, a second display unit having a second display screen that is arranged side-by-side with the first display screen, and a plurality of area selection keys that are physical keys each including a key switch, the area selection keys being arranged to correspond to coordinate data indicating positions of a plurality of areas on the first display screen, the control method comprising:
detecting, by an input information detecting unit, an operation instruction input to one of the area selection keys that is selected by pressing one of the key switches and outputting the coordinate data;
specifying, in response to any one of the plurality of area selection keys being selected by pressing one of the key switches, an enlargement area of the plurality of areas, the enlargement area corresponding to the selected area selection key;
receiving, at an enlargement frame display control unit, the coordinate data from the input information detection unit, saving the received coordinate data as an enlargement frame, and controlling the first display screen to display an enlargement frame around the enlargement area; and receiving, at an enlarged information display control unit, the coordinate data from the input information detection unit, reading display information stored in a memory saved for the enlargement area, and enlarging the read display information on the first display screen that is displayed in the enlargement frame, and displaying that enlarged information on the second display screen.

20. A non-transitory computer readable recording medium on which a program is recorded that causes a computer that controls the enlarged display of a portable terminal device that includes a first display unit having a first display screen, a second display unit having a second display screen that is arranged side-by-side with the first display screen, and a plurality of area selection keys that are physical keys each including a key switch, the area selection keys being arranged to correspond to positions of a plurality of areas on the first display screen, the computer executing a method, comprising:

detecting, by an input information detecting unit, an operation instruction input to one of the area selection keys that is selected by pressing one of the key switches and outputting the coordinate data;

specifying, in response to any one of the plurality of area selection keys being selected by pressing one of the key switches, an enlargement area of the plurality of areas, the enlargement area corresponding to the selected area selection key;

receiving, at an enlargement frame display control unit, the coordinate data from the input information detection unit, saving the received coordinate data as an enlargement frame, and controlling the first display screen to display an enlargement frame around the enlargement area; and receiving, at an enlarged information display control unit, the coordinate data from the input information detection unit, reading displaying information stored in a memory saved for the enlargement area, and enlarging the read display information on the first display screen that is displayed in the enlargement frame, and displaying that enlarged information on the second display screen.

* * * * *